United States Patent [19]

Matsuwake et al.

[11] 3,854,181

[45] Dec. 17, 1974

[54] METHOD OF PRODUCING VARIABLE CAPACITORS

[75] Inventors: Yoshio Matsuwake; Yukihisa Fujishima, both of Furukawa, Japan

[73] Assignee: Alps Electric Co., Ltd., Tokyo, Japan

[22] Filed: Apr. 2, 1973

[21] Appl. No.: 346,828

[52] U.S. Cl............... 29/25.41, 29/471.1, 219/118, 317/253
[51] Int. Cl............................................ H01g 13/00
[58] Field of Search............. 29/25.41, 471.1, 472.1; 317/253, 249 R; 219/91, 118

[56] References Cited
UNITED STATES PATENTS

| | | | |
|---|---|---|---|
| 2,257,643 | 9/1941 | Paschke............................ | 29/25.41 |
| 2,435,789 | 2/1948 | Lea et al........................... | 29/25.41 |

*Primary Examiner*—Charles W. Lanham
*Assistant Examiner*—Carl E. Hall

[57] ABSTRACT

In producing a variable capacitor, a desired number of stator electrodes are stacked alternately with spacers, before attaching the stator electrodes to a stationary capacitor body, and the stacked electrode-spacer structure is pressed and heated to cause fusion-welded coupling between electrodes and spacers through metal plated on the surface of each spacer to form an integrated stator structure. After the desired number of rotor electrodes are stacked in combination with spacers and fusion-welded in an integrated form, the integrated stator electrode structure and the integrated rotor electrode structure are assembled with the capacitor stationary member and a rotor shaft to produce the variable capacitor.

2 Claims, 7 Drawing Figures

PATENTED DEC 17 1974 3,854,181
FIG. 1
FIG. 2
FIG. 3
FIG. 4
FIG. 5
FIG. 6
FIG. 7
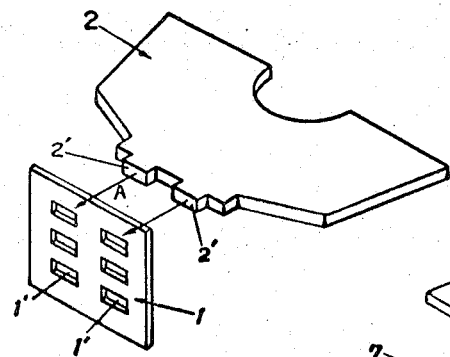
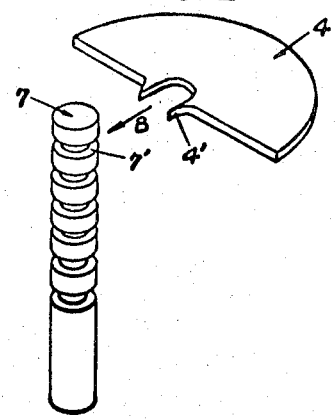
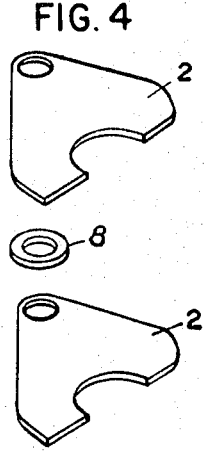
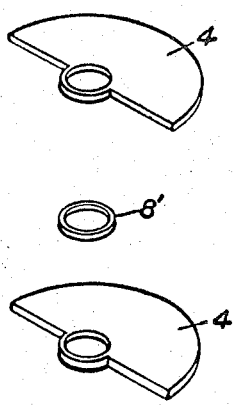
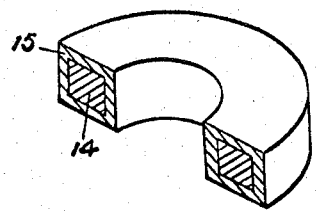
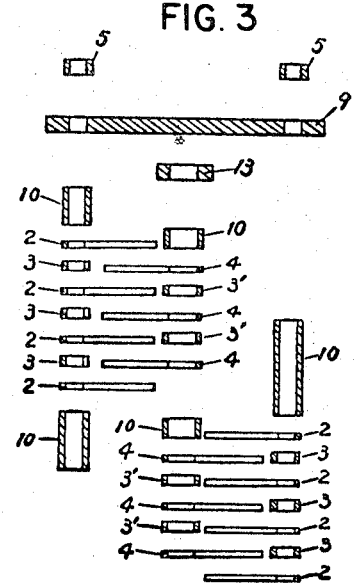
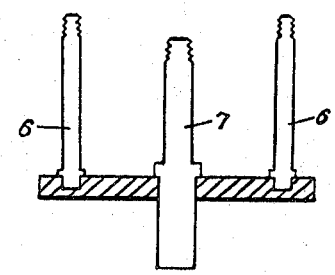
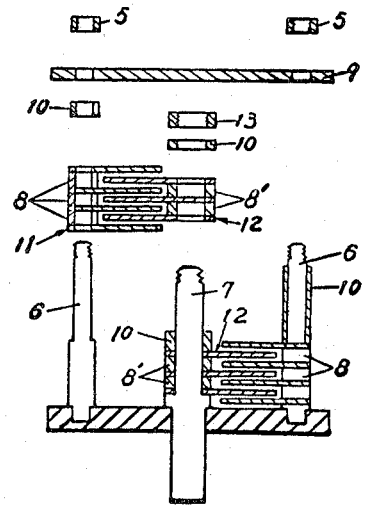

METHOD OF PRODUCING VARIABLE CAPACITORS

BACKGROUND OF THE INVENTION

This invention relates to a method of producing a variable capacitor and, more particularly, to a method of producing a variable capacitor including plural stator electrodes and plural rotor electrodes.

It is an object of the present invention to provide a method of producing a variable capacitor.

It is a more specific object of the present invention to provide a method of producing a variable capacitor including stator and rotor electrodes which can remarkably reduce the assembly time required to produce the capacitor and makes handling of the very thin electrodes very easy.

Other objects and advantages of the present invention as well as the drawbacks of the prior art will become clear as the description proceeds.

SUMMARY OF THE INVENTION

According to the present invention, a method of producing a variable capacitor is provided. A variable capacitor comprising stator and rotor electrodes is preferably produced by the steps of preparing the desired numbers of highly conductive stator electrodes, highly conductive rotor electrodes, and spacers. Each spacer consists of a highly conductive core metal and is plated by a metal whose specific volume resistivity is larger than that of the core metal. The stator electrodes and spacers as well as the rotor electrodes and spacers are alternatively stacked so that each stacked structure has capacitor electrodes positioned on the outermost ends. Each stacked structure is then pressed and heated with the contacting zones between spacers and electrodes melting the metal plated on each spacer, in each contacting zone, and causing adjacent electrodes and spacers to fusion-weld one another through the molten plated metal. After cooling, the integrated rotor electrode structure is assembled to a rotor shaft and the integrated stator electrode structure is assembled to a capacitor stationary member to produce the desired variable capacitor.

BRIEF DESCRIPTION OF THE DRAWINGS

FIG. 1 is a perspective view showing the process of coupling a stator electrode with a stationary member in the prior art;

FIG. 2 is a perspective view showing the process of coupling a rotor electrode with a rotor shaft in the prior art;

FIG. 3 is an exploded schematic cross sectional view showing the assembling process of a variable capacitor in the prior art;

FIG. 4 is a perspective view showing the relation between two stator electrodes and one spacer in the present invention;

FIG. 5 is a perspective view showing the relation between two rotor electrodes and one spacer in the present invention;

FIG. 6 is a schematic view showing the construction of the spacer used in accordance with the present invention; and FIG. 7 is an exploded schematic cross sectional view showing the assembling process of a variable capacitor according to the present invention.

DESCRIPTION OF THE PREFERRED EMBODIMENT

FIGS. 1 through 3 shows the conventional steps in assembling a variable capacitor, in order to clarify drawbacks of the prior art and facilitate understanding of the present invention.

According to the conventional methods of manufacturing and/or assembling variable capacitors, as shown in FIGS. 1-3, the typical steps of assembling a number of stator or rotor electrodes in a stacked arrangement are summarized as follows: as shown schematically in FIG. 1, each stator electrode 2 is shifted in the direction of arrow-A and its projections 2' are inserted into electrode fastening holes 1' formed in a stationary member 1, and, then, the projections 2' are mechanically adhered or crimped whereby the stator electrodes 2 are secured to the stationary member 1. As shown schematically in FIG. 2, in such conventional construction each rotor electrode 4 is shifted in the direction of arrow-B and its coupling portions 4' are fitted with pressure in respective grooves 7' formed around a rotor shaft 7 so that the rotor electrodes are secured to the rotor shaft. As shown schematically in FIG. 3, the stator electrodes 2 and stator spacers 3 are alternately stacked with stator rods 6 passing through holes formed in the electrodes and spacers while rotor electrodes 4 and rotor spacers 3' are alternately stacked with a rotor shaft 7 passing through holes formed in the electrodes and spacers, and, then, the assembly is tied together by use of screws 5 or the like.

In the foregoing conventional processes, the first two methods, (described with reference to FIGS. 1 and 2) are hardly applicable to electrodes whose thickness is smaller than 0.15 mm because of the mechanical calking or crimping operation required and it is hardly possible to manufacture minaturized variable capacitors. According to the third method (described with reference to FIG. 3) though it can handle very thin electrodes and miniaturize variable capacitor structures, the spacers must be stacked alternately together with stator electrodes or rotor electrodes, so it has the drawbacks of large man-hour utilization and resulting poor productivity.

The present invention has been engineered in view of the above-described prior art, and obviates the drawbacks of the conventional manufacturing methods.

Now, the present invention will be described with reference to FIGS. 4 through 7, wherein corresponding parts are identified by the same reference numbers as those employed in FIGS. 1 to 3.

In FIGS. 4 through 7, 2 is a stator electrode made of an electrically highly conductive metal, such as copper or copper alloy, 4 is a rotor electrode made of an electrically highly conductive metal such as copper or copper alloy, 8 and 8' are spacers. Each of the spacers 8 and 8' comprises an annular metal member 14 made of electrically highly conductive metal such as copper or copper alloy whose surface is plated by a metal 15 such as nickel, tin or tin-lead alloy, whose specific volume resistivity is greater than that of the metal of the core of the annular metal member 14.

In the assembly operation, stator electrodes 2 and spacers 8 as well as rotor electrodes 4 and spacers 8' are respectively alternately stacked one upon another so that stator electrodes 2 or rotor electrodes 4 are positioned on the opposite outermost ends. In the next step each stacked structure is pressed and heated, for example by use of a spot welding machine, gas flame, high sonic wave, or induction heating means, so as to rise the temperatures in the contacting zones between adjacent spacer and stator or rotor electrode up to or higher than the melting point of nickel, tin or tin-lead alloy. As a result of such heating the plated metal 15 such as nickel, tin or tin-lead alloy covering the spacer annular member 14, melts and fusion-welds with the stator or rotor electrodes. It should be noted that the metal forming the stator and rotor electrodes generates little heat and does not itself melt during the heating process because the specific volume resistivity of copper or copper alloy is small relative to that of nickel, tin or tin-lead alloy.

Where a resistance welding machine is used, the working electrodes of the welding machine directly contacts the copper or copper alloy forming the outermost stator or rotor electrodes of the stacked electrode structure, so that these capacitor electrodes do not adhere to the machine's working electrodes because of the low contact resistance between the welding machine and the capacitor electrodes.

Thereafter, by cooling the heated structure while keeping it in the stacked state, the molten metal such as nickel, tin or tin-lead alloy having a high specific volume resistivity solidifies into the fusion-welded state and fixes the spaces to the stator or rotor electrodes. In the foregoing process, should the plating thickness of metal 15 having a high specific volume resistivity be limited to 5 or less percent of the spacer's axial length (thickness), it is possible to control the tolerance of spacing between adjacent stator or rotor electrodes in the fusion-welded stacked structure within 10 percent of the spacer's length.

In the next step the integrated stator electrode structure 11 and the integrated rotor electrode structure 12, each constructed in accordance with the foregoing operation, are meshed (geared) to each other in a predetermined relation as shown in FIG. 7; the stator structure 11 is shifted so that the stator rods 6 fit in the aligned holes provided in the structure while the rotor structure 12 is shifted so that the rotor shaft 7 fits in the aligned hole formed in the structure 12; fixing spacers 10 are placed as shown in FIG. 7; the integrated rotor electrode structure 12 is fixed to the rotor shaft 7 by a screw 13; a rear-side plate 9 is disposed so that its holes engage the stator rods 6; and, at last, by use of screws 5 or through a crimping or adhesive operation the desired variable capacitor is completed.

As a modification of the above-described embodical capacitor each of the electrodes employed as the stator electrodes is covered by an organic plastic resin film, for example polyethylene and the like, which acts as an insulation. In this case the portions of the organic film covered electrode have metal exposed and those metal exposed portions are subjected to heat. That is, because the time the exposed metal is in the molten state is very short, the organic film is little damaged and thus, the present invention can be effectively and widely employed.

As described hereinabove, according to the present invention, because plural stator electrodes and rotor electrodes are surely integrated or united through a simple operation, the man-hours required in mounting the integrated electrode structures to the capacitor body is remarkably reduced. Further, because the present invention converts a number of discrete capacitor electrodes, which are very difficult to handle since each electrodes are very small and very thin, to an integrated stator or rotor electrode structure prior to attachment thereof to the capacitor body, it becomes very easy to handle and position the capacitor electrodes thereby increasing productivity of miniaturized variable capacitors. Accordingly, it will be understood that the present invention can provide miniature variable capacitors with high productivity.

We claim:

1. A method of producing a variable capacitor comprising the steps of preparing selected numbers of highly conductive stator electrodes, highly conductive rotor electrodes, and spacers, each of said spacers having a core of a first highly conductive metal and an exterior coating of a second metal whose specific volume resistivity is larger than that of the highly conductive metal of its core, stacking alternately said stator electrodes and said spacers to form a first structure and said rotor electrodes and said spacers to form a second structure such that each stacked structure has the electrodes positioned on the outermost opposite ends, pressing each stacked structure and heating contacting zones between said spacers and said electrodes to melt the metal plated around each said spacer in each contacting zone and to cause adjacent electrodes and spacers to fusion-weld one to another through the molten plated metal, cooling said welded electrode structures, and, assembling the integrated rotor electrode structure to a rotor shaft and the integrated stator electrode structure to a capacitor stationary member to thereby produce a variable capacitor.

2. The method as set forth in claim 1 wherein the heating step is carried out by use of a resistance welding machine.

* * * * *